United States Patent [19]

Takada

[11] Patent Number: 4,793,631
[45] Date of Patent: Dec. 27, 1988

[54] MOUNTING FOR INFLATABLE SAFETY BAG

[76] Inventor: Juichiro Takada, 3-12-1 Shinmachi Setagayaku, Tokyo, Japan

[21] Appl. No.: 930,319

[22] Filed: Nov. 12, 1986

[51] Int. Cl.$^4$ .......................................... B60R 21/08
[52] U.S. Cl. .................................................. 280/743
[58] Field of Search ............... 280/730, 731, 732, 728, 280/743

[56] References Cited

U.S. PATENT DOCUMENTS

| | | | |
|---|---|---|---|
| 3,944,250 | 3/1976 | Wulf et al. | 280/732 |
| 4,148,503 | 4/1979 | Shiratori et al. | 280/731 |
| 4,183,550 | 1/1980 | Sudou | 280/743 |
| 4,278,638 | 7/1981 | Nilsson et al. | 280/731 |

Primary Examiner—David M. Mitchell
Assistant Examiner—Ross Weaver
Attorney, Agent, or Firm—Brumbaugh, Graves, Donohue & Raymond

[57] ABSTRACT

A mounting for an inflatable safety bag having an opening in communication with the discharge of a gas generator to inflate the bag in an emergency condition in which the bag is clamped between a base retainer and an annular retainer and the peripheral region of the bag surrounding the opening has a chain-stitched stitch in the bag around the opening and adjacent the inner face of one of the retainers, so that upon inflation of the bag the forces which tend to pull the clamped peripheral region of the bag from the retainers will be resisted by the engagement of the chain-stitched stitch with the inner face.

5 Claims, 1 Drawing Sheet

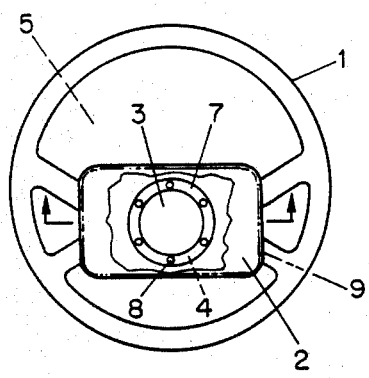
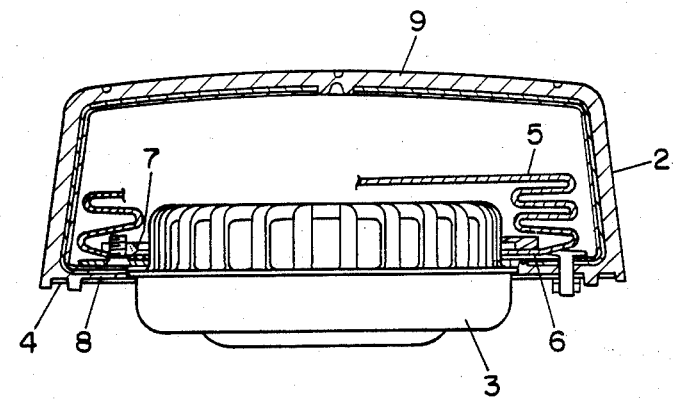
FIG. 1
(PRIOR ART)
FIG. 2
(PRIOR ART)
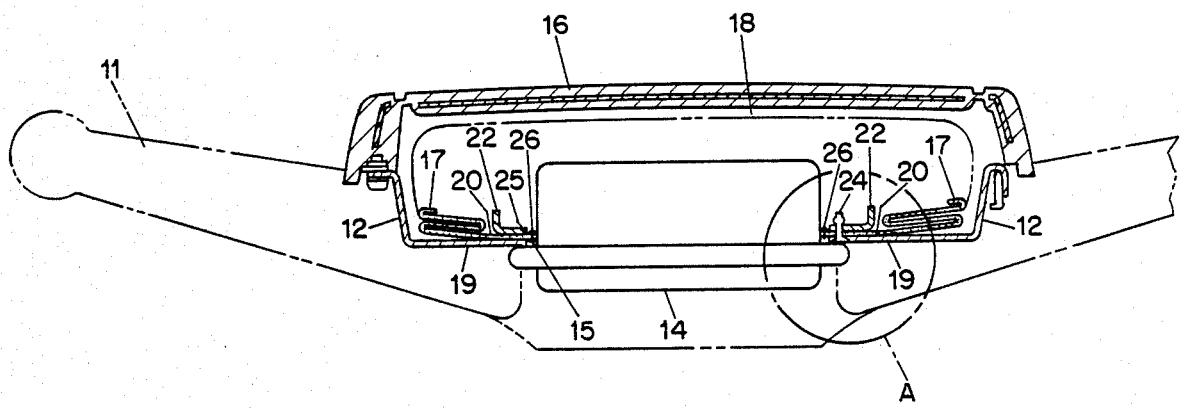
FIG. 3
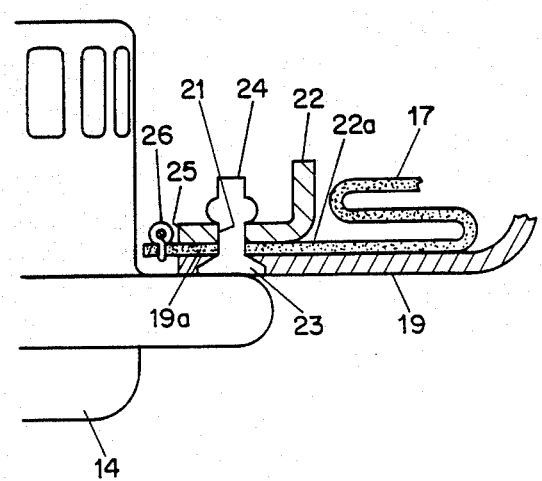
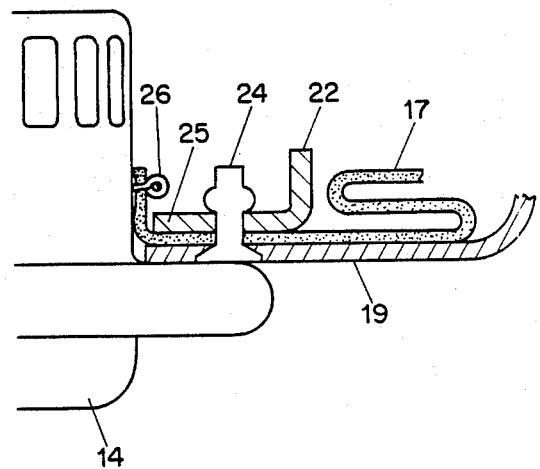
FIG. 4
FIG. 5

MOUNTING FOR INFLATABLE SAFETY BAG

DESCRIPTION

1. Field of the Invention

The present invention relates to an improved mounting for an inflatable safety bag and, more particularly, to a novel mounting arrangement which provides increased resistance to the forces which act to separate the inflatable bag from the mounting.

2. Statement of the Prior Art

In an automobile equipped with an inflatable safety bag, the bag is instantly inflated in the event of a collision to protect a passenger from injury. The bag is inflated by the pressure of a gas supplied from a gas generator fixed to the steering wheel, dashboard or other part of the body of the automobile.

The high pressure supplied to the inflatable safety bag necessary to produce instantaneous inflation produces forces which tend to pull and separate the safety bag from its mounting. In addition, the impact of the passenger against the inflated safety bag tends to increase these forces. To resist these high forces, a mounting of considerable strength must be provided to insure the safety of the passenger.

In a conventional mounting for an inflatable safety bag, the peripheral region around the outer circumference of the gas opening into the bag is clamped between a base retainer provided around the discharge of the gas generator and an annular retainer secured to the base retainer. The base retainer is mounted to the car body, for example, the steering wheel. The annular retainer is bolted or riveted to the base retainer. In the event of a collision, the large forces produced by the inflation of the bag and the impact of the body of the person against the bag tend to pull the clamped portion of the bag from the clamping retainers, and the clamping action of the retainers may be insufficient to prevent separation of the bag from the retainers. Needless to say, failure of the mounting or damage to the bag will permit the escape of gas and endanger the safety of the passenger.

In another conventional mounting arrangement designed to overcome this problem, the annular retainer is made from a thick metal sheet having a large sectional area to increase the strength and rigidity of the mounting. However, in this arrangement the increased cost of the annular retainer, the additional cost of drilling the bolt or rivet holes through the thicker metal stock, and the increased weight of the mounting are drawbacks and present problems which are overcome by the present invention.

SUMMARY OF THE INVENTION

The present invention provides a novel and improved mounting for an inflatable safety bag which overcomes the problems of the aforementioned conventional mounting arrangements. According to the present invention, the air bag is clamped between a pair of retainers and a chain-stitched stitch is provided in the peripheral region adjacent the inner annular face of at least one of the retainer members, so that upon inflation of the bag the forces which tend to pull the clamped portion from the retainers will be resisted by the chain-stitched stitch. This arrangement makes it possible to utilize an annular retainer of lighter weight and less expensive material made of relatively thin metal sheet, thus providing a solution to the problems of conventional mounting arrangements.

BRIEF DESCRIPTION OF THE DRAWINGS

The aforesaid and other objects and features of the present invention will be apparent from the description which follows and by reference to the accompanying drawings, in which:

FIG. 1 is a view showing an automobile steering wheel provided with a conventional mounting arrangement for an inflatable safety bag;

FIG. 2 is an enlarged sectional view taken along the line 2—2 of FIG. 1, as viewed in the direction of the arrows;

FIG. 3 is a sectional view similar to the view shown in FIG. 2, but showing the inflatable bag mounted according to the present invention;

FIG. 4 is an enlarged sectional view of the portion of FIG. 3 within the circle A; and FIG. 5 is a sectional view similar to FIG. 4 of an alternative embodiment of the invention.

DESCRIPTION OF THE PRIOR ART

Referring to the prior art inflatable safety bag mounting arrangement shown in FIGS. 1 and 2, a steering wheel 1 has a strength-imparting metal base member 2 secured to it. A gas generator 3 is accommodated within a large opening at the center of the base member. An inflatable bag 5 having a gas intake opening surrounded by a peripheral region 6 is clamped around the discharge of the gas generator so that in the event of a collision, the gas generator will discharge gas into the inflatable bag and inflate the bag across the steering wheel to absorb the impact of the passenger against the bag.

The inner flange 4 of the base member 2 serves as a base retainer for clamping the peripheral region 6 of the bag. The peripheral region 6 of the bag is clamped between the base retainer 4 of the bag and an annular metal retainer 7. The annular retainer 7 is secured to the base retainer 4 by a plurality of bolts or rivets 8 spaced apart around the annular retainer. A break-away cover 9 encloses the inflatable bag. In the event of a crash or collision, the gas generator inflates the bag instantly to protect the passenger.

Since the inflatable bag is mounted solely by the clamping action of the base retainer 4 and the annular retainer 7 at the locations of the bolts or rivets 8, the radial forces which tend to pull the clamped portion of the bag from between the retainers may separate the bag from the mounting and damage the bag, permitting leakage of gas from the inflated air bag. Such leakage of gas may prevent the bag from functioning properly to protect the passenger.

DESCRIPTION OF THE PREFERRED EMBODIMENTS

Referring to FIGS. 3 and 4 showing the present invention, the steering wheel 11 of an automobile has a strength-imparting base member 12 fixed to it by a stay fitting. A gas generator 14 is accommodated within a central opening 15 of the base member 12. A cover 16 attached to the base member 12 accommodates a folded-up inflatable safety bag 17 within a chamber 18 defined between the cover and the base member.

The inflatable bag has a gas intake opening in communication with the discharge of the gas generator to inflate the bag in an emergency condition. The peripheral region 20 of the bag around the outer circumference of the opening is mounted between a base retainer 19 defined by the inner flange of the base member 12 and an annular retainer 22 secured to the base retainer by rivets or bolts 24.

The extreme inner peripheral region around the circumference of the gas intake opening of the bag extends inwardly of the clamped region bag and has a circumferential chain-stitched stitch 26 adjacent the inner annular face 25 of the retainer 22. The chain-stitched stitch can be formed by a conventional stitching machine using thread or filament of sufficient diameter or thickness so that when the bag is inflated the engagement chain-stitched stitch against inner annular face 25 of the retainer 22 will resist the radial forces which act to pull the clamped portion of the bag from the mounting. More specifically, when the air bag is inflated and the body of the passenger impacts against the inflated bag, the interaction between the stitch and inner face of the retainer prevents the radially outward forces from displacing the clamped portion of the bag outwardly relative to the opposed clamping faces of the retainers 19, 22.

Since the stitch engages the inner face of the retainer 22 and the latter is firmly secured to the base retainer 19, the annular retainer can be made of a lighter weight and less rigid material. As shown the annular retainer has an outer upstanding flange 27. The annular retainer can be made by blanking thin sheet stock into an annular shape, press molding the blank into an L-shaped section shown in FIGS. 4 and 5 and then drilling the bolt or rivet holes 21 at equally spaced intervals. Corresponding holes are also provided in the base retainer.

In an alternative embodiment of the invention shown in FIG. 5, the inner peripheral region of the bag which accommodates the chain-stitched stitch engages the outer surface of the gas generator, so that it is deflected upwardly in perpendicular relation to the portion of the bag clamped between the base retainer 19 and the annular retainer 22. In this arrangement the inner face 25 of the annular retainer is spaced from the outer surface of the gas generator by a distance slightly exceeding the thickness of the bag between them, and the stitch 26 is disposed adjacent the upper inner surface of the retainer 22.

The objects of the invention can be achieved by a single stitch, preferably a continuous stitch around the peripheral region of the gas opening in the bag. Since the edge of the stitch is preferably located adjacent the inner face 25 of the annular retainer, or alternatively, a corresponding inner face of the retainer 19, it is preferable that both the face 25 and the stitch 26 are circular in shape and that the inner circumference of the face is slightly greater than the outer circumference of the stitch. Moreover, since the stitch also serves to reinforce the peripheral region of the inflatable bag, increased reinforcement can be obtained by a plurality of concentric stitches arranged in parallel relation.

In order to assemble the inflatable bag to the mounting, the peripheral region 20 of the bag having the stitch chain-stitched on inside surface is first attached to the base retainer 19 with the opening 15 of the base retainer aligned with the gas opening of the bag. The annular retainer 22 is then placed against the inner surface of the peripheral region 20 of the bag and aligned with respect to the stitch. The bolts or rivets are then inserted through the holes in the retainers and through the clamped portion of the bag. To prevent escape of the gas, a sealant or caulking can be applied between the interfacing surfaces.

In the operation of the inflatable safety bag, the impact on crash or collision is detected by a sensor (not shown) which ignites the gas generator. The generator discharges gas into the bag to rapidly inflate it, breaking away the cover so that the bag can expand over the entire steering wheel and absorb the impact of the passenger. At this time the clamped portion of the bag is subjected to high radial forces which act to pull the bag from its mounting. However, the engagement of the chain-stitched stitch with the inner face of the annular retainer acts in opposition to those forces and retains the bag firmly in place, thus preventing gas leakage and assuring the protection of the passenger.

Although the invention has been described in an application in which the inflatable bag is mounted to a steering wheel, the present invention can be mounted to the dashboard or some other part of the body of the automobile.

According to the air bag mounting arrangement of the present invention, it is possible to make the annular retainer 22 of a lightweight and inexpensive material having a low bending rigidity in a direction normal to the plane of the retainer, for example, a thin sheet metal retainer formed by pressing, thereby reducing the production cost of the mounting. In addition, the strength of the air bag and its mounting are significantly increased to afford superior performance and greater safety.

The invention has been shown and described in preferred forms and by way of example, and it is understood that variations and modifications can be made therein without departing from the spirit and scope of the invention.

I claim:

1. A mounting for an inflatable safety bag having an opening in communication with the discharge of a gas generator to inflate the bag in an emergency condition, comprising a pair of retainers clamping between them a peripheral region of the bag surrounding the opening and a chain-stitched stitch in the bag around the opening and adjacent an inner face of at least one of the retainers, so that upon inflation of the bag the forces which tend to pull the clamped peripheral region of the bag from the retainers will be resisted by the engagement of said chain-stitched stitch with said inner face.

2. A mounting as set forth in claim 1 in which the pair of retainers includes a securely mounted base retainer and an annular retainer secured to the base retainer through the peripheral region of the bag, the stitch being located adjacent an inner annular face of the annular retainer.

3. A mounting as set forth in claim 2, in which the annular retainer has an outer upstanding flange.

4. A mounting as set forth in claim 1, including an upstanding surface of the gas generator engaging and deflecting the inner peripheral region in which the stitch is formed and in which the spacing between the inner face of the annular retainer and upstanding surface of the gas generator is such that the stitch is adjacent the inner face of the annular retainer and above the upper surface thereof.

5. A mounting as set forth in claim 1 in which the inner face of the retainer and the stitch are circular in shape and arranged concentrically so that the inner circumference of the retainer face slightly exceeds the outer circumference of the stitch.

* * * * *